(12) United States Patent
Gibb et al.

(10) Patent No.: US 10,996,892 B2
(45) Date of Patent: May 4, 2021

(54) APPARATUS AND METHOD FOR CONTROLLING DATA ACCELERATION

(71) Applicant: Eidetic Communications Inc., Calgary (CA)

(72) Inventors: Sean Gibb, Calgary (CA); Roger Bertschmann, Calgary (CA)

(73) Assignee: Eidetic Communications Inc., Calgary (CA)

( * ) Notice: Subject to any disclaimer, the term of this patent is extended or adjusted under 35 U.S.C. 154(b) by 0 days.

(21) Appl. No.: 16/335,916

(22) PCT Filed: May 2, 2018

(86) PCT No.: PCT/CA2018/050520
§ 371 (c)(1),
(2) Date: Mar. 22, 2019

(87) PCT Pub. No.: WO2018/201249
PCT Pub. Date: Nov. 8, 2018

(65) Prior Publication Data
US 2020/0050401 A1    Feb. 13, 2020

Related U.S. Application Data

(60) Provisional application No. 62/500,794, filed on May 3, 2017.

(51) Int. Cl.
*G06F 3/00* (2006.01)
*G06F 3/06* (2006.01)
*G06F 9/38* (2018.01)

(52) U.S. Cl.
CPC .......... *G06F 3/0659* (2013.01); *G06F 3/0607* (2013.01); *G06F 3/0656* (2013.01); *G06F 3/0679* (2013.01); *G06F 9/3877* (2013.01)

(58) Field of Classification Search
None
See application file for complete search history.

(56) References Cited

U.S. PATENT DOCUMENTS

2015/0212878 A1    7/2015  Segev et al.
2015/0317088 A1    11/2015 Hussain et al.
(Continued)

FOREIGN PATENT DOCUMENTS

WO    2016135875 A1    9/2016

OTHER PUBLICATIONS

International Patent Application No. PCT/CA2018/050520, International Search Report and Written Opinion dated Jul. 20, 2018.
(Continued)

*Primary Examiner* — Midys Rojas
(74) *Attorney, Agent, or Firm* — Borden Ladner Gervais LLP; Todd Keeler (57) ABSTRACT

Systems and methods are provided that facilitate performing hardware acceleration processes without utilizing specialized drivers that are software and hardware specific by controlling the hardware accelerator with NVMe commands. The NVMe commands may be based on standardized NVMe commands provided in the NVMe specification, or may be vendor-specific commands that are supported by the NVMe specification. The commands are sent to the NVMe accelerator by a host CPU which, in some embodiments, may be located remotely to the NVMe accelerator. The NVMe accelerator may include a CMB on which a host CPU may set up an NVMe queue in order to reduce PCIe traffic on a PCIe bus connecting the CPU and the NVMe accelerator. The CMB may also be used by a host CPU to transfer data for acceleration to reduce bandwidth in the DMA controller or to remove host staging buffers and memory copies.

20 Claims, 6 Drawing Sheets

(56) References Cited

U.S. PATENT DOCUMENTS

2016/0094619 A1 3/2016 Khan et al.
2018/0011812 A1 1/2018 Morishita et al.

OTHER PUBLICATIONS

Tseng et al., "Gullfoss: Accelerating and Simplifying Data Movement among Heterogeneous Computing and Storage Resources," Dec. 2015, pp. 1-12, Retrieved from: [URL: https://pdfs.semanticscholar.org/0cba/dd3a63ddc748cc30a16a706eda77a4deab8c.pdf?_ga=%202.88326559.526903688.1525710074-1799878047.1525710074].
Zhang et al., "NVMMU: A Non-volatile Memory Management Unit for Heterogeneous GPU-SSD Architectures," 2015 International Conference on Parallel Architecture and Compilation (PACT), Dec. 2015, pp. 13-24.
International Patent Application No. PCT/CA2018/050520, International Preliminary Report on Patentability dated Nov. 5, 2019.
European Patent Application No. 18795114.0, Communication pursuant to Rules 70(2) and 70a(2) EPC dated Feb. 2, 2021.
European Patent Application No. 18795114.0, Extended European Search Report dated Jan. 15, 2021.

APPARATUS AND METHOD FOR CONTROLLING DATA ACCELERATION

CROSS REFERENCE TO RELATED

This application claims the benefit of priority of U.S. Provisional Patent Application No. 62/500,794 filed May 3, 2017, which is hereby incorporated by reference.

FIELD

The present disclosure relates to controlling data acceleration including but not limited to algorithmic and data analytics acceleration.

BACKGROUND

With the predicted end of Moore's Law, data acceleration, including algorithm and data analytics acceleration, has become a prime research topic in order to continue improving computing performance. Initially general purpose graphical processing units (GPGPU), or video cards, were the primary hardware utilized for performing algorithm acceleration. More recently, field programmable gate arrays (FPGAs) have become more popular for performing acceleration.

Typically, an FPGA is connected to a computer processing unit (CPU) via a Peripheral Component Interconnect Express (PCIe) bus with the FPGA interfacing with the CPU via drivers that are specific to the particular software and hardware platform utilized for acceleration. In a data center, cache coherent interfaces, including Coherent Accelerator Processor Interface (CAPI) and Cache Coherent Interconnect (CCIX), have been developed to address the difficulties in deploying acceleration platforms by allowing developers to circumvent the inherent difficulties associated with proprietary interfaces and drivers and to accelerate data more rapidly.

Non-volatile memory (NVM), such as Flash memory, is increasingly being utilized for in storage devices. NVM solid state drives (SSD) allow data storage and retrieval more quickly compared to older spinning disk media. As data storage is centralized and NVM SSD storage becomes more prevalent, platforms that enable performing data acceleration quicker and that utilize less power than presently known platforms are desired.

Therefore, improvements to controlling hardware acceleration are desired.

BRIEF DESCRIPTION OF THE DRAWINGS

Embodiments of the present disclosure will now be described, by way of example only, with reference to the attached Figures.

DETAILED DESCRIPTION

The present disclosure provides systems and methods that facilitate performing hardware acceleration processes without utilizing specialized drivers that are software and hardware specific by controlling the hardware accelerator with NVMe commands. The NVMe commands may be based on standardized NVMe commands provided in the NVMe specification, or may be vendor-specific commands that are supported by the NVMe specification. The commands are sent to the NVMe accelerator by a host CPU which, in some embodiments, may be located remotely to the NVMe accelerator. The NVMe accelerator may include a CMB on which a host CPU may set up an NVMe queue in order to reduce PCIe traffic on a PCIe bus connecting the CPU and the NVMe accelerator.

Embodiments of the present disclosure relate to utilizing the Non-volatile Memory Express (NVMe) specification for controlling hardware acceleration.

In an embodiment, the present disclosure provides a method for controlling a hardware accelerator that includes receiving from a host, at a NVMe interface associated with the hardware accelerator and unassociated with a solid state drive, a first NVMe command, the first NVMe command having a format of a disk read or write function but being unrelated to a disk read or write function, determining, by the NVMe interface, an acceleration process associated with the received first NVMe command, performing the acceleration function at the hardware accelerator to generate result data.

In an example embodiment, the method further includes receiving at the NVMe interface from the host a second NVMe command, the second NVMe command associated with a request for the result data generated by the performance of the acceleration function and having a format of a disk read or write function but being unrelated to a disk read or write function, and in response to receiving the second NVMe command, transmitting the result data.

In an example embodiment, the first NVMe command received from the host is a write command and the second NVMe command is a read command.

In an example embodiment, one of the first command and the second command is a write command to a one of a plurality of namespaces normally associated with an SSD, and the other of the first and second disk access commands is a read command to the one of the plurality of namespaces, wherein each of the namespaces is associated with a respective acceleration function.

In an example embodiment, the method further includes determining, at the NVMe interface, that the hardware accelerator has completed performing the acceleration function, and sending from the NVME interface to the host an NVMe complete message indicating that the acceleration function has been performed.

In an example embodiment, the first NVMe command and the second NVMe command are vendor-specific commands.

In an example embodiment, the first NVMe command includes a first memory address to which the result data is to be written, and wherein performing the acceleration includes writing the result data to the first memory address included in the first NVMe command.

In an example embodiment, the second NVMe command includes a second memory address to which the result data is to be transmitted, and wherein transmitting the result data in response to receiving the second NVMe command includes writing the result data to the second memory address.

In an example embodiment, receiving the first NVMe command includes receiving the first NVMe command via a network connecting the NVMe interface and the host.

In an example embodiment, receiving the first NVMe command at the NVMe interface comprises receiving the first NVMe command at a Controller Memory Buffer of the NVMe interface.

In another embodiment, the present disclosure provides an accelerator for performing an acceleration process that includes an NMVe interface and at least one hardware accelerator in communication with the NVMe interface and configured to perform the acceleration process, wherein the NVMe interface is configured to receive from a host a first NVMe command, the first NVMe command having a format of a disk read or write function but being unrelated to a disk read or write function, determine an acceleration process associated with the received first NVMe command, signal the hardware accelerator to perform the acceleration function.

In an example embodiment, the NVMe interface is further configured to receive from the host a second NVMe command, the second NVMe command associated with a request for the result data generated by the performance of the acceleration function and having a format of a disk read or write function but being unrelated to a disk read or write function, and in response to receiving the second NVMe command, transmit the result data.

In an example embodiment, the first NVMe command received from the host is a write command and the second NVMe command is a read command.

In an example embodiment, one of the first command and the second command is a write command to a one of a plurality of namespaces normally associated with a solid state drive (SSD), and the other of the first and second disk access commands is a read command to the one of the plurality of namespaces, wherein each of the namespaces is associated with a respective acceleration function.

In an example embodiment, the NVMe interface is further configured to determine, that the hardware accelerator has completed performing the acceleration function, and send to the host an NVMe complete message indicating that the acceleration function has been performed.

In an example embodiment, the first NVMe command and the second NVMe command are vendor-specific commands.

In an example embodiment, the first NVMe command includes a first memory address to which the result data is to be written, and wherein performing the acceleration includes writing the result data to the first memory address included in the first NVMe command.

In an example embodiment, the second NVMe command includes a second memory address to which the result data is to be transmitted, and wherein transmitting the result data in response to receiving the second NVMe command includes writing the result data to the second memory address.

In an example embodiment, receiving the first NVMe command comprises receiving the first NVMe command via a network connecting the NVMe interface and the host.

In an example embodiment, the accelerator includes a Command Memory Buffer (CMB), wherein receiving the first NVMe command at the NVMe interface comprises receiving the first NVMe command at the CMB.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

The NVMe specification is a protocol that was developed in response to the need for a faster interface between computer processing units (CPUs) and solid state disks (SSDs). NVMe is a logical device interface specification for accessing storage devices connected to a CPU via a Peripheral Component Interconnect Express (PCIe) bus that provides a leaner interface for accessing the storage device versus older interfaces and was designed with the characteristics of non-volatile memory in mind. NVMe was designed solely for, and has traditionally been utilized solely for, storing and retrieving data on a storage device, and not for controlling hardware acceleration.

In the NVMe specification, NVMe disk access commands, such as for example read/write commands, are sent from the host CPU to the controller of the storage device using command queues. Controller administration and configuration is handled via admin queues while input/output (I/O) queues handle data management. Each NVMe command queue may include one or more submission queues and one completion queue. Commands are provided from the host CPU to the controller of the storage device via the submission queues and responses are returned to the host CPU via the completion queue.

Commands sent to the administration and I/O queues follow the same basic steps to issue and complete commands. The host CPU creates a read or write command to execute in the appropriate submission queue and then writes a tail doorbell register associated with that queue signalling to the controller that a submission entry is ready to be executed. The controller fetches the read or write command by using, for example, direct memory access (DMA) if the command resides in host memory or directly if it resides in controller memory, and executes the read or write command.

Once execution is completed for the read or write command, the controller writes a completion entry to the associated completion queue. The controller optionally generates an interrupt to the host CPU to indicate that there is a completion entry to process. The host CPU pulls and processes the completion queue entry and then writes a doorbell head register for the completion queue indicating that the completion entry has been processed.

In the NVMe specification, the read or write commands in the submission queue may be completed out of order. The memory for the queues and data to transfer to and from the controller typically resides in the host CPU's memory space; however, the NVMe specification allows for the memory of queues and data blocks to be allocated in the controller's memory space using a Controller Memory Buffer (CMB). The NVMe standard has vendor-specific register and command space that can be used to configure an NVMe storage device with customized configuration and commands.

Controlling hardware acceleration is traditionally performed utilizing the PCIe specification. However, the use of the PCIe specification requires specialized drivers that are dependent on the software, such as for example the operating system that is utilized by the host, and the target hardware. By contrast, the NVMe specification utilizes standard drivers that may be utilized with any software and hardware platform. Therefore, utilizing commands of the NVMe specification for controlling hardware acceleration may reduce the need for specialized drivers, and therefore simplify hardware acceleration compared to traditional hardware acceleration systems that are controlled using, for example, the PCIe specification.

One context in which hardware acceleration has traditionally been utilized is in data storage, for example at a data center. In order to protect data that is stored in data centers from being lost, more than one copy of the data may be stored in order to provide redundancy. In this way, if one copy of the data is lost by, for example, the storage device on which the data is stored becoming corrupted, that storage device may be regenerated by copying one of the redundant copies to a new storage device.

However, because the hardware expense of providing a separate storage device for each copy of the data may be very high, error correction (EC) processes, similar to the error correction utilized in communication, may be utilized to reduce the cost associated with redundancy. EC processes are typically based on the Reed-Solomon (RS) erasure coded block in which multiple storage devices of the data center are allocated to store parity data associated with data stored at other storage devices that are allocated for data storage. By utilizing parity data to provide redundancy, the number of hardware devices may be reduced compared to having multiple storage devices each storing a redundant copy of the data.

The reduction in hardware expense is offset in an increase in computing resources utilized when the data is lost and must be restored on a storage device. When a block of data is lost, or a storage device is to be rebuilt, rebuilding the missing data is performed by reading the data from a number of non-corrupt data and parity storage devices, which are used to calculate the missing blocks of data, which may be written to a replacement storage device. Calculating the missing blocks of data from the stored data and parity is computation intensive and, if performed by, for example, a host CPU of the data center may result in overloading the CPU. When calculating missing blocks of data, such as the calculations performed when utilizing an EC process, hardware accelerators may be utilized to perform the calculations in order to reduce the computation load on the host CPU.

Figure 1:
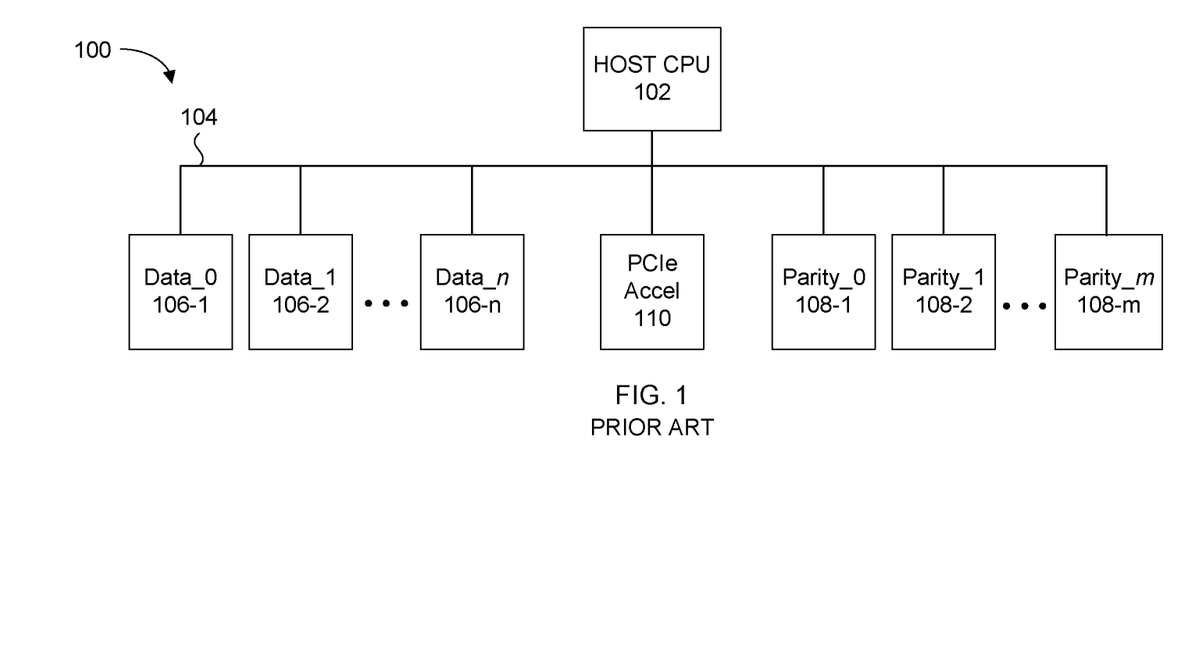
FIG. 1 is a schematic diagram of a data storage and acceleration system according to the prior art.

FIG. 1 shows a schematic diagram of an example known data storage and accelerator system 100 suitable for utilizing an EC process for data storage. The data storage accelerator system 100 includes a host CPU 102, data storage devices 106-1, . . . , 106-*n* allocated for storing data, parity storage devices 108-1, . . . , 108-*m* allocated for storing parity information, and a PCIe accelerator 110 for performing, for example, an EC process. The host CPU 102, the data storage devices 106-1, . . . , 106-*n*, the parity storage devices 108-1, . . . , 108-*m*, and the PCIe accelerator 110 are connected together via a PCIe bus 104.

The example system 100 shown includes n data storage devices 106-1 to 106-*n* and *m* parity storage devices 108-1 to 108-*m* allocated for storing parity information, where n and m may be positive integer numbers and may be determined based on the specific EC process utilized for generating parity information. For example, with a RS (12,4) process, four parity storage devices 108 are included for every twelve data storage devices 106 that are included.

The PCIe accelerator 110 includes a PCIe interface (not shown) and one or more hardware accelerators (not shown) which may be, for example, field programmable gate arrays (FPGAs). Recovering lost data, for example as described previously, may be initiated by the host CPU 102 sending a proprietary command over the PCIe bus to the PCIe accelerator 110, which is received by the proprietary accelerator interface. In response to receiving the command from the host CPU 102, the proprietary accelerator interface signals the hardware accelerator to read the data from the non-corrupted data storage devices 106 and the parity information from the parity storage devices 108 and calculate the data. As described above, PCIe accelerators have the inherent problem of requiring customized drivers that require support across multiple OSes.

Embodiments of the present disclosure provide an accelerator that utilizes a feature of the NVMe specification in order to reduce at least some of the above described problems inherent with PCIe accelerators. The NVMe accelerator may utilize NVMe commands to perform acceleration processes, rather than disk access functions as intended by the NVMe specification. In this manner, the host CPU may treat an NVMe accelerator similar to an NVMe controller in order to perform acceleration processes utilizing the standard drivers that are already built into operating systems to support the NVMe standard. Facilitating acceleration utilizing standard drivers already in place reduces software engineering needed to implement hardware acceleration. Using the NVMe specification to control hardware acceleration is outside the scope and expectations of the NVMe specification and, therefore, some modification to the NVMe specification may be required to control hardware acceleration utilizing the NVMe specification, as described in more detail below.

Figure 2:
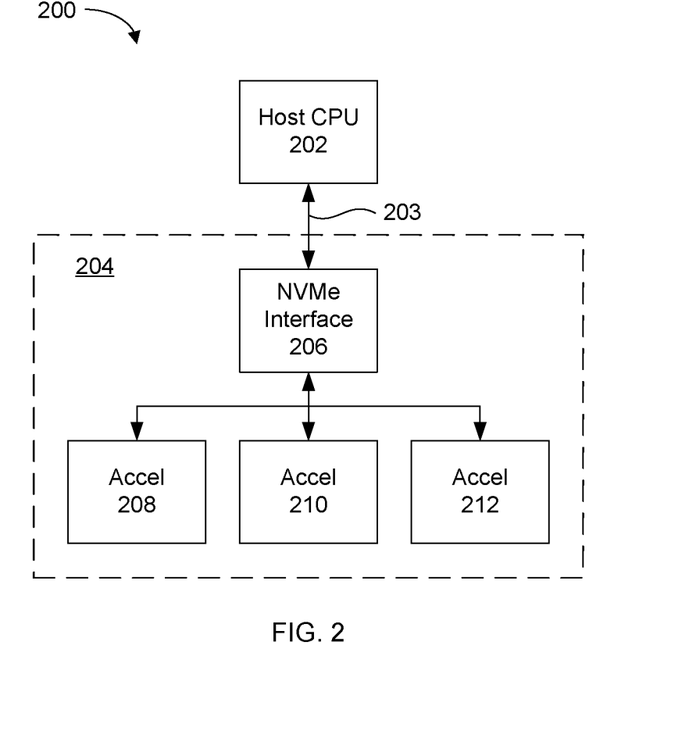
FIG. 2 is a schematic diagram of an accelerator system architecture utilizing an NVMe interface in accordance with the present disclosure.

Referring to FIG. 2, an example acceleration system 200 is shown in which a host CPU 202 sends NVMe commands, rather than PCIe commands, to an NVMe accelerator 204. The host CPU 202 may be connected to the NVMe accelerator via a PCIe bus 203.

The NVMe accelerator 204 includes one or more hardware accelerators 208, 210, 212, each of which may be, for example, configured to perform a different acceleration function. The example NVMe accelerator 204 shown in FIG. 2 includes three hardware accelerators 208, 210, 212. However, other example NVMe accelerators may include more or fewer than three hardware accelerators, or a single hardware accelerator may be configured to perform multiple different acceleration processes. The example NVMe accelerator 204 shown in FIG. 2 includes an NVMe interface 206 that receives commands from the host CPU 202 and, based on the commands, signals one or more of the hardware accelerators 208, 210, 212 to perform the appropriate acceleration. The NVMe interface 206 is included within the NVMe accelerator 204 itself and thus the accelerator appears to the Host CPU 202 to be an NVMe storage device though it may not have associated persistent storage, such as an SSD, that the interface controls. The use of an NVMe interface 206 for an accelerator does not constrain the host CPU 202 to have other NVMe devices, such as NVMe SSDs, nor does it restrict the host CPU 202 from having other NVMe devices.

The commands send from the host CPU 202 to the NVMe accelerator 204 may be, for example, standard NVMe disk access commands included in the NVMe specification, but the standard NVMe disk access commands are utilized as acceleration commands not disk access commands. Alternatively, the commands sent from the host CPU 202 may be customized commands that are supported by the vendor-specific registers and command space included within the NVMe specification, as described in more detail below.

Figure 3:
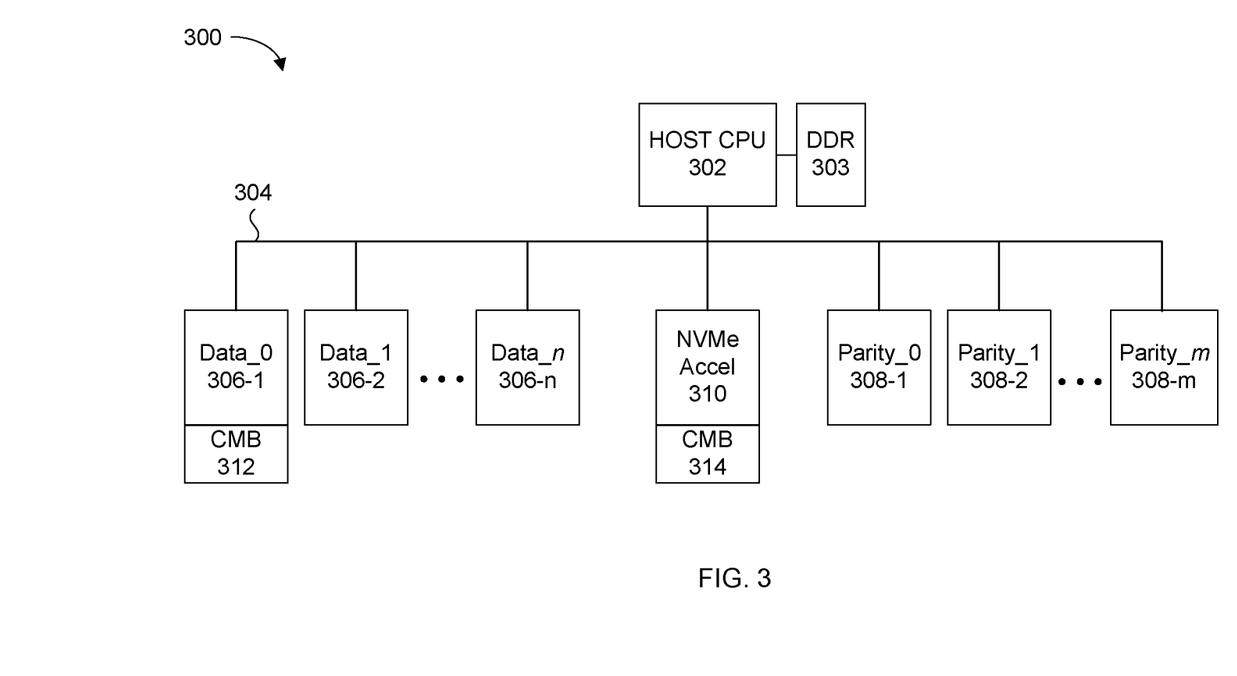
FIG. 3 is a schematic diagram of data storage and acceleration system utilizing an NVMe interface in accordance with the present disclosure.

Referring now to FIG. 3, an example data storage and acceleration system 300 that includes an NVMe accelerator 310 is shown. The system 300 also includes a host CPU 302, n data storage devices 306-1 to 306-n, and m parity storage devices 308-1 to 308-m connected via a PCIe bus 304, which may be substantially similar to the host CPU 102, the data storage devices 106, the parity storage devices 108, and the PCIe bus 104 described above with reference to FIG. 1, and therefore are not further described here to avoid repetition.

The NVMe accelerator 310 may be substantially similar to the NVMe accelerator 204 described in relation to FIG. 2 such that the host CPU 302 issues NVMe commands to the NVMe accelerator 310 to perform acceleration processes. In addition to including an NVMe accelerator 310, rather than a PCIe accelerator as shown in the system 100 of FIG. 1, the example system 300 shown in FIG. 3 includes CMBs 312 and 314 at data storage device 306-1 and the NVMe accelerator 310, respectively. Although the example shown in FIG. 3 includes two CMBs 312, 314, in other examples more or less than two CMBs may be included in the system 300. The CMBs 312, 314 enable the host CPU 302 to establish NVMe queues on the NVMe devices rather than in a random access memory associated with the host CPU 302, such as for example double data rate memory (DDR) 303. Establishing NVMe queues on the CMBs 312,314 of the NVMe devices may be utilized to reduce the PCIe bandwidth used by the PCIe bus of the system 300 by reducing the PCIe traffic associated with DMA transfers.

Although the system 300 includes the NVMe accelerator 310, the data storage devices 306 and the parity storage devices 308 connected to the same PCIe bus 304, in other examples, some or all of the data storage devices 306, the parity storage devices 308 may be located remotely such that data is transferred over a network from a remote host.

Figure 4:
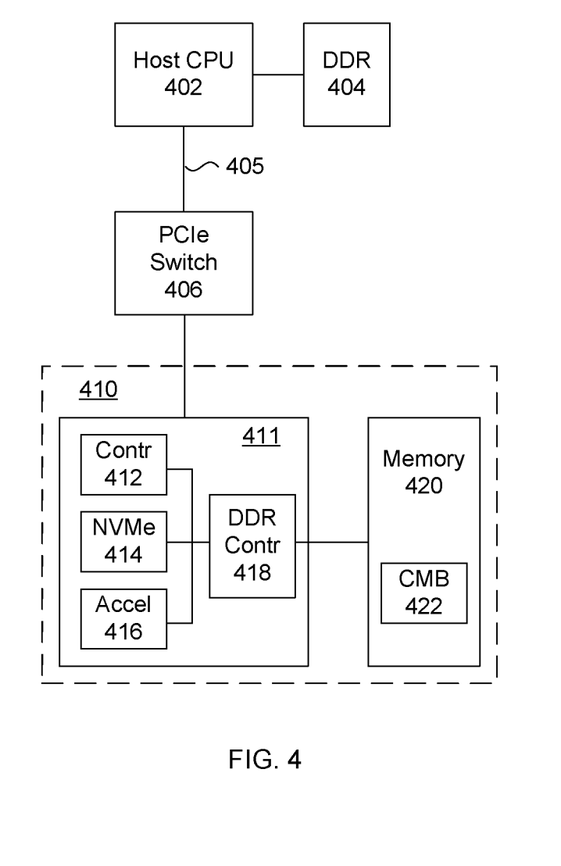
FIG. 4 is a schematic diagram of an accelerator system for performing acceleration utilizing an NVMe interface in accordance with the present disclosure.

Referring to FIG. 4, an example acceleration system 400 is shown in which acceleration may be performed on, for example, data from remote data storage devices (not shown) accessible over a network 424. The system 400 includes a host CPU 402 having an associated DDR memory 404, and an NVMe accelerator 410. The NVMe accelerator 410 is connected to the host CPU 402 via a PCIe switch 406 which is connected to the host CPU 402 via PCIe bus 405.

The PCIe switch 406 enables the NVMe accelerator 410 being disconnected from the host CPU 402 and connected to other devices. For example, the PCIe switch may be utilized to connect the NVMe accelerator to storage devices or other CPUs. Further, as described in more detail below with reference to FIG. 5, the PCIe switch 406 may be utilized to connect the NVMe accelerator 410 to a network.

The NVMe accelerator 410 includes a field programmable gate array (FPGA) 411 and optionally an onboard memory 420 on which a controller CMB 422 may be provided. The onboard memory 420 may be, for example, double data rate memory (DDR), or any other suitable type of memory. As described above, the CMB 422 facilitates the host CPU 402 setting up NVMe queues on the NVMe accelerator 410 itself, reducing traffic over the PCIe bus 405.

The FPGA 411 includes a controller 412, which includes a DMA engine, an NVMe interface 414, one or more hardware accelerators 416, and a DDR controller 418.

Similar to the description above with respect to the NVMe accelerator 204 shown in FIG. 2, the NVMe accelerator 410 may be controlled by standard NVMe commands, such as standard NVMe read and write commands, or may be controlled by vendor-specific commands, for example as described below. The DMA engine of the controller 412 may be utilized to transfer submission and completion commands and to transfer data to and from the hardware accelerators 416 in the event that a CMB is not utilized.

In an example of utilizing standard NVMe commands, the host CPU 402 may initiate an acceleration process by sending a standard NVMe disk access command, such as a disk write command, to the NVMe accelerator 410. The results of the acceleration process may be retrieved by the host CPU 402 by sending another standard NVMe disk access command, such as a read command, to the NVMe accelerator 410. Here, standard NVMe disk access commands are utilized for acceleration control, rather than for disk access functions as intended by the NVMe specification.

In an example in which the NVMe accelerator 410 includes multiple hardware accelerators 416, each hardware accelerator 416 may be associated with respective NVMe namespaces. For example, the NVMe namespaces may be, for example, logical block addresses that would otherwise have been associated with an SSD. In an embodiment, the disk access commands are sent in relation to an NVMe namespace that would otherwise have been associated with an SSD, but is instead used to enable hardware acceleration, and in some cases a specific type of hardware acceleration.

In an example embodiment, the NVMe accelerator 410 is configured to perform two different acceleration processes: 1) a secured hash algorithm that generates a fixed 256-bit hash (SHA-256); and 2) EC. In this example: the SHA-256 may be associated with Namespace 1; EC encoding may be associated with Namespace 2; and EC decoding may be associated with Namespace 3. In this example, the host CPU 402 may send data to be EC encoded by the NVMe accelerator 410 by performing an NVMe write command to Namespace 2, and may retrieve the resultant EC encoded data by performing an NVMe read command to Namespace 2.

In an example of utilizing vendor-specific commands, the host CPU 402 may send vendor-specific commands to a submission queue of an NVMe accelerator 410. The submission queue may reside in either the DDR 404 of the host CPU 402 or the CMB 422 of the NVMe accelerator 410. The vendor-specific commands may be indicated by the opcode and facilitate the submission command providing customized control and command information to the accelerator 416 and the completion command providing customized feedback information from the controller 412 of the accelerator 416 to the host CPU 402. In the case in which the NVMe accelerator 410 includes multiple accelerators 416, each accelerator 416 configured to perform a different acceleration process, different opcodes may be assigned to the different acceleration processes.

In an example embodiment, data is provided to the accelerator 416 using the submission command via the DMA engine of the controller 412 and by pulling from a memory address provided in the vendor-specific command sent from the host CPU 402. The accelerator 416 performs the acceleration process specified by the opcode of the vendor-specific command, for example, an EC decoding acceleration on the data. After the accelerator 416 completes the acceleration process on input data, the controller 412 provides a completion command back to the host CPU 402 indicating that acceleration is compete. If the accelerator output data is relatively small, the output data may be included in the completion command. For example, the output data for a SHA-256 cryptographic hash function is 256 bits (32 bytes), which is small enough that it may be included in a completion command.

For acceleration processes that generate a large amount of output data, the vendor-specific submission command that initiates the acceleration process may include a 64-bit address of a storage device to which the host CPU 402 wishes the output data to be written. In this case, the output data may be written directly to the 64-bit memory mapped address. The 64-bit memory address may be associated with a memory of, for example the computer that includes the host CPU and the NVMe accelerator 410, or on another local or remote PCIe attached device such as, for example, a CMB enabled NVMe drive connected to the NVMe accelerator 410 via the PCIe switch 406. In the case in which the vendor-specific submission command includes a 64-bit address, the completion command will be sent to the host CPU 402 only after the data transfer to the requested location is completed.

In an example, the NVMe accelerator 410 may be configured such that the CMB 422 maps to an onboard memory 420, which is typically a DDR, of the NVMe accelerator 410 connected to the FPGA 411 using a DDR controller 418. In this example, input data and acceleration commands may be provided by the host CPU 402 by sending standard NVMe commands or vendor-specific commands and pulling the input data using the DMA Controller 412, as described above, or by writing the input data directly to the CMB 422. Output data generated by the hardware accelerator 416 processing the input data may be written directly to the CMB 422 or may be provided using a completion command as described above. Upon completion of the acceleration process, the NVMe accelerator 410 may provide a vendor-specific completion message to the host CPU 402 that contains the memory mapped address to the results in CMB 422 in onboard memory 420 so the host CPU 402 can retrieve the output data. By providing a direct connection between the host CPU 402 and onboard memory 420 on the NVMe accelerator 410, the host CPU 402 has the ability to retrieve output data from the onboard memory 420 and transmit the data to any other device including, for example, devices connected to the NVMe accelerator via the PCIe switch 406.

Using the CMB 422 for data transfers lowers the bandwidth on the DMA engine of the controller 412 and may avoid a potential bottleneck in the controller 412. Using the CMB 422 for data transfers also removes the need for a host CPU 402 to provide a staging buffer and perform a memory copy between a data source, such as a hard drive, and an accelerator 416 because the data source can provide data directly to the accelerator 416. Using the CMB 422 to receive the data from one submission command does not force other submission commands to use the CMB 422 for their respective data and following commands may use the DMA engine of the controller 412 to pull data from host memory DDR 404. Bottlenecks in the DDR controller 418 and DMA engine of the controller 412 may be mitigated by using both data transfer mechanisms.

As discussed above, the PCIe switch 406 may facilitate the NVMe accelerator 410 connecting with other devices over a network, such as, for example, storage devices or CPUs at remote locations.

Figure 5:
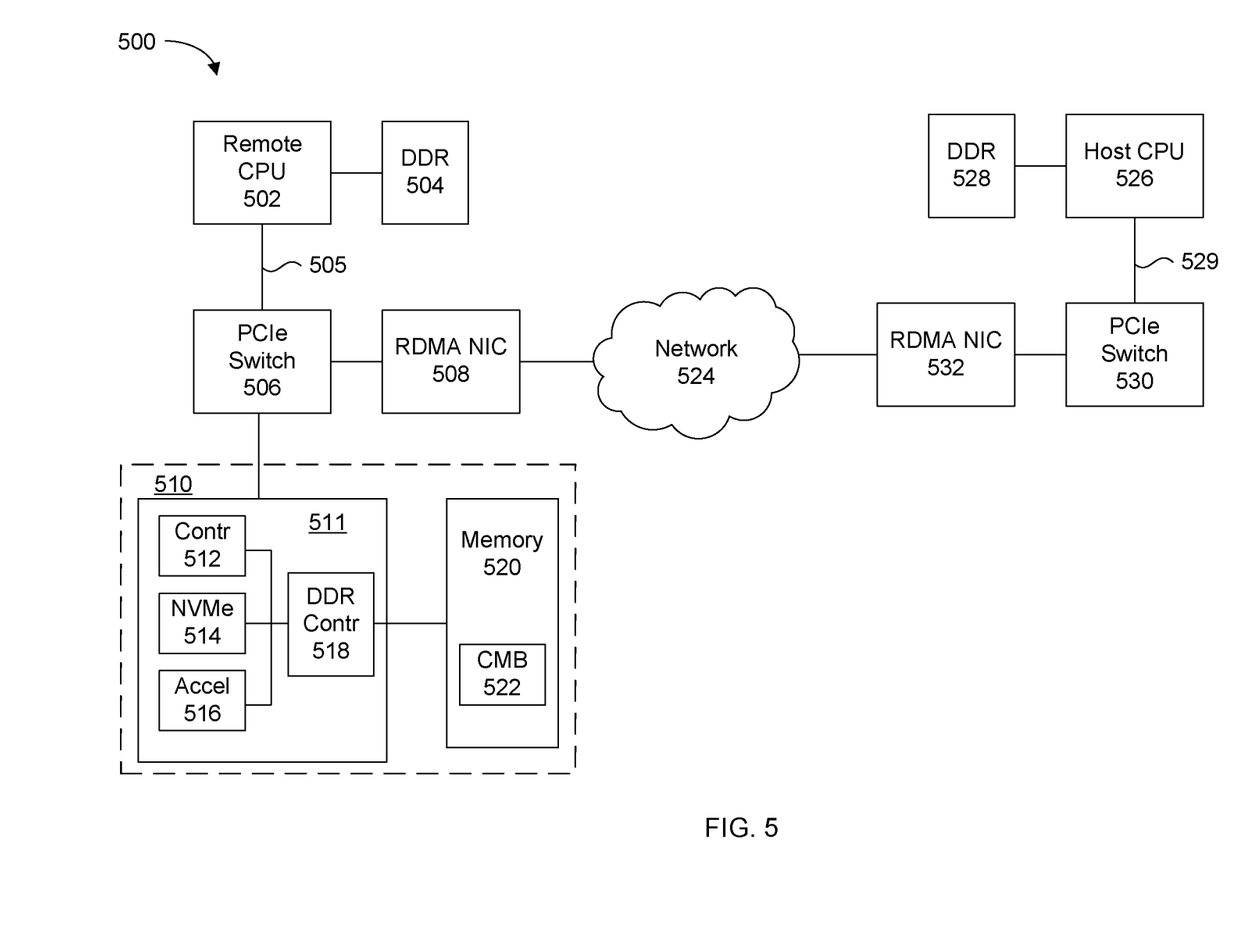
FIG. 5 is a schematic diagram of an accelerator system for performing acceleration over a network utilizing an NVMe interface in accordance with the present disclosure.

FIG. 5 shows an example of a system 500 in which a host CPU 526 does not have a locally connected hardware accelerator, but is able to access a remote NVMe accelerator 510 over a network 524 in order to perform acceleration processes without loading the remote CPU 502 at the location of the remote NVMe accelerator 510.

In FIG. 5, the remote CPU 502, the DDR 504, the PCIe switch 506, the NVMe accelerator 510, the FPGA 511, the controller 512, the NVMe interface 514, the hardware accelerators 516, the DDR controller 518, the optional memory 520 having a CMB 522 are substantially similar to the host CPU 402, the DDR 404, the PCIe switch 406, the NVMe accelerator 410, the FPGA 411, the controller 412, the NVMe engine 414, the hardware accelerator 416, the DDR controller 418, the optional memory 420 having a CMB 422 described above with reference to FIG. 4 and therefore are not further described here to avoid repetition. The remote CPU 502 is connected to the NVMe accelerator over a PCIe bus 505. Further the PCIe switch 506 is connected to a remote direct access memory network interface card (RDMA NIC) 508 that facilitates connecting the NVMe accelerator 510 to a network 524.

The host CPU 526 has an associated DDR 528. The host CPU 526 is connected to a PCIe switch 530 over a PCIe bus 529. The PCIe switch 530 is connected to a RDMA NIC 532 which facilitates connecting the host CPU 526 to the NVMe accelerator 510 over the network 524. The network 524 may be any suitable network that facilitates transmitting data between devices, including wired networks, wireless networks, or a combination of wired and wireless networks.

In the system 500, the host CPU 526 is able to connect directly with the remote NVMe accelerator 510 to push data directly from, for example, the DDR 528 to the remote NVMe accelerator 510 without loading the remote CPU 502 and without the remote CPU 502 necessarily being aware that the transaction between the host CPU 526 and the remote NVMe accelerator 510 has taken place. Similarly, data can be pulled from the remote NVMe accelerator 510 by the host CPU 526 without intervention or awareness from the remote CPU 502. The remote CPU 502 may also access the acceleration functionality of the NVMe accelerator 510, as described above. Therefore, the system 500 shown in FIG. 5 may facilitate a distributed network of NVMe accelerators 510 that may be shared among a plurality of CPUs in order reduce deployment costs in situations in which a dedicated NVMe accelerator is unwarranted.

In practice, any number of host CPUs 526 may connect with the NVMe accelerator 510 over the network 524. In addition, the NVMe accelerator 510 may connect to any number of storage devices over the network 524.

A challenge associated with a distributed accelerator in system 500 is managing quality of service for acceleration processes in view of CPUs 526 remote to the NVMe accelerator 510 pushing data to the NVMe accelerator 510 without the other CPUs being aware of the NVMe accelerator load. This challenge may be addressed by implementing vendor-specific commands that allow a CPU to query the NVMe accelerator 510 for the accelerator load data, such as for example the current and the average acceleration load. This query may facilitate a CPU finding an in-network NVMe accelerator 510 with the desired bandwidth to process the acceleration to be performed. Alternatively, the acceleration load statistics of the NVMe accelerator 510 can reside in CMB 522 allowing a CPU 502, 526 reading the load directly from the memory 520 of the NVMe accelerator 510.

Figure 6:
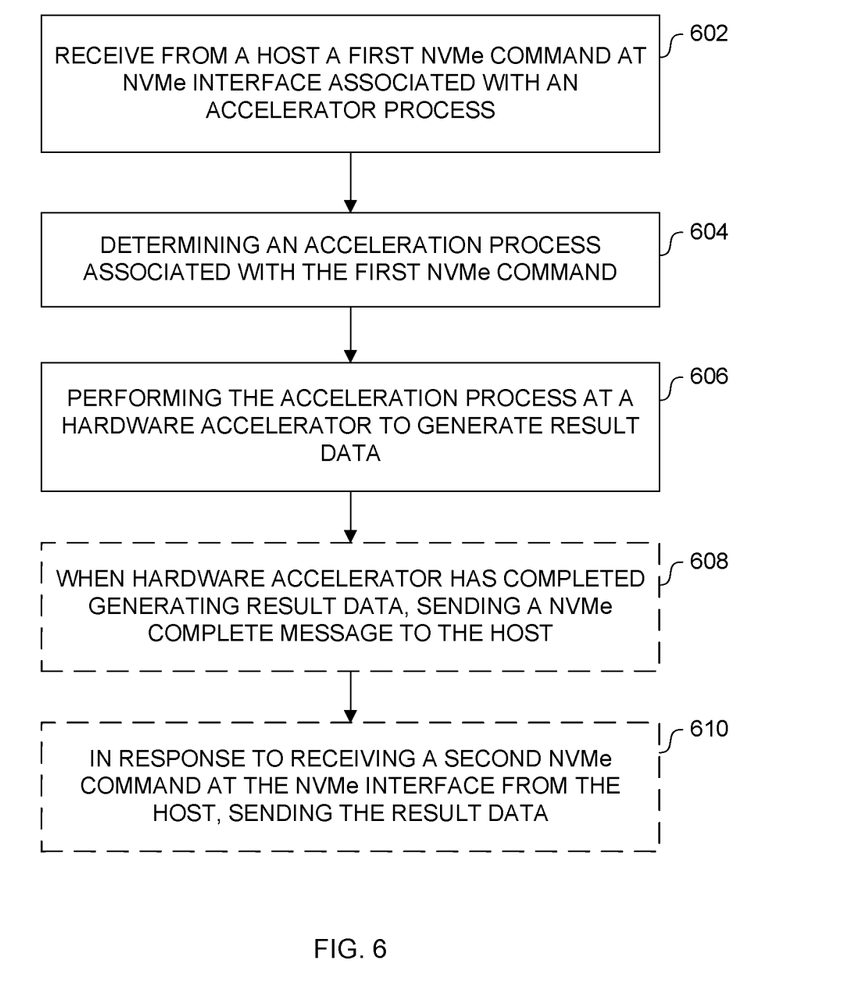
FIG. 6 is a flow chart illustrating a method for controlling a hardware accelerator in accordance with the present disclosure.

Referring now to FIG. 6, a flow chart illustrating a method for controlling an accelerator using the NVMe specification is shown. The method may be implemented in any of the example NVMe accelerators described above. The method may be performed by, for example, a processor of an NVMe accelerator that performs instructions stored in a memory of the NVMe accelerator.

At 602, a first NVMe command associated with an accelerator process is received at an NVMe interface of an NVMe accelerator from a host CPU. As disclosed above, the format of the first NVMe command may be the format of a standard NVMe command, such as a standard disk access command in accordance with the NVMe specification such as for example a read or write command, or may be a vendor-specific command. For example, the first NVMe command may be a standard NVMe read/write command that may include a namespace that would otherwise be associated with an SSD, where the included namespace is instead associated with the acceleration process. A vendor-specific command may include an address to which the result data generated by the acceleration process is to be written. Further, the first NVMe command may be received from a host CPU that is local, or from a host CPU that is remote such that the first NVMe command is received over a network.

At 604, the acceleration function associated with the received first NVMe command is determined. For example, as described above, if the first NVMe command is in the format of a standard NVMe command, then the determining at 604 may comprise determining the acceleration function associated with a namespace that would otherwise be associated with an SSD, but is now associated with an acceleration function, that is included within the first NVMe command. The determining at 604 may also include determining one of a plurality of hardware accelerators that are configured to perform the acceleration process associated with the first NVMe command.

At 606, the acceleration process is performed by a hardware accelerator. Performing the acceleration process at 606 may include sending the input data to be processed to the hardware accelerator, or signalling the hardware accelerator to retrieve the input data. Performing the acceleration processes at 606 may also include signalling the acceleration hardware to write the generated result data to a particular address.

Optionally at 608, a complete message is sent to the host CPU when the hardware accelerator has completed performing the acceleration process. The complete message may be a standard NVMe complete message, or may be a vendor-specific complete message. For example, a vendor-specific complete message may include the result data if the result data is small enough to be included in the complete message. If the result data is written by the hardware accelerator to a particular memory address specified by the host CPU in the first NVMe command, then complete message may be sent once the result data has been completely written to the specified address. The vendor-specific NVMe complete message may include an address at which the result data has been written.

Optionally at 610, a second NVMe command may be received from the host CPU to retrieve the result data and in response to receiving the second NVMe command, the result data may be sent. The second NVMe command may be, for example, a standard NVMe disk access command, such as a standard read or write command in accordance with the NVMe specification, or may be a vendor-specific command. The standard read/write command may include a namespace, where the included namespace is associated with the acceleration process, such that the result data from the acceleration process associated with the namespace is the data sent to the host CPU. A vendor-specific command may include an address to which the result data is to be sent to.

Embodiments of the present disclosure facilitate performing hardware acceleration processes without utilizing specialized drivers that are software and hardware specific by controlling the hardware accelerator with NVMe commands. The NVMe commands may be based on standardized NVMe commands provided in the NVMe specification, or may be vendor-specific commands that are supported by the NVMe specification. The commands are sent to the NVMe accelerator by a host CPU which, in some embodiments, may be located remotely to the NVMe accelerator. The NVMe accelerator may include a CMB on which a host CPU may set up an NVMe queue in order to reduce PCIe traffic on a PCIe bus connecting the CPU and the NVMe accelerator. The CMB may also be used by a host CPU to transfer data for acceleration algorithms to remove host staging buffers, reduce bandwidth in the DMA controller, or to remove host memory copies.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for controlling a hardware accelerator, the method comprising:
   receiving from a host, at a NVMe interface associated with the hardware accelerator and unassociated with a solid state drive, a first NVMe command, the first NVMe command having a format of a disk read or write function but being unrelated to a disk read or write function;
   determining, by the NVMe interface, an acceleration function associated with the received first NVMe command, the acceleration function being a function other than a disk read or write function;

performing the acceleration function at the hardware accelerator to generate result data.

2. The method of claim 1, further comprising:
receiving at the NVMe interface from the host a second NVMe command, the second NVMe command associated with a request for the result data generated by the performance of the acceleration function and having a format of a disk read or write function but being unrelated to a disk read or write function, and
in response to receiving the second NVMe command, transmitting the result data.

3. The method of claim 2, wherein the first NVMe command received from the host is a write command and the second NVMe command is a read command.

4. The method of claim 2, wherein one of the first NVMe command and the second NVMe command is a write command to a one of a plurality of namespaces, the namespaces having a format of a namespace associated with a solid state drive (SSD), and the other of the first and second NVMe commands is a read command to the one of the plurality of namespaces, wherein each of the namespaces is associated with a respective acceleration function and is not associated with an SSD namespace.

5. The method of claim 2, wherein the first NVMe command and the second NVMe command are vendor-specific commands.

6. The method of claim 5, wherein the second NVMe command includes a second memory address to which the result data is to be transmitted, and wherein transmitting the result data in response to receiving the second NVMe command includes writing the result data to the second memory address.

7. The method of claim 1, further comprising:
determining, at the NVMe interface, that the hardware accelerator has completed performing the acceleration function; and
sending from the NVME interface to the host a NVMe complete message indicating that the acceleration function has been performed.

8. The method of claim 1, wherein the first NVMe command includes a first memory address from which input data is to be read, and wherein the method further comprises the input data from the first memory address included in the first NVMe command in addition to performing the acceleration function on the input data to generate the result data.

9. The method of claim 1, wherein receiving the first NVMe command comprises receiving the first NVMe command via a network connecting the NVMe interface and the host.

10. The method of claim 1, wherein receiving the first NVMe command at the NVMe interface comprises receiving the first NVMe command at a Controller Memory Buffer of the NVMe interface.

11. An accelerator for performing an acceleration process, the accelerator comprising: an NVMe interface and at least one hardware accelerator in communication with the NVMe interface and configured to perform the acceleration process, wherein the NVMe interface is configured to:
receive from a host a first NVMe command, the first NVMe command having a format of a disk read or write function but being unrelated to a disk read or write function;
determine an acceleration function associated with the received first NVMe command, the acceleration function being a function other than a disk read or write function;
signal the hardware accelerator to perform the acceleration function.

12. The accelerator of claim 11, wherein the NVMe interface is further configured to:
receive from the host a second NVMe command, the second NVMe command associated with a request for the result data generated by the performance of the acceleration function and having a format of a disk read or write function but being unrelated to a disk read or write function, and
in response to receiving the second NVMe command, signal the hardware accelerator to transmit the result data.

13. The accelerator of claim 12, wherein the first NVMe command received from the host is a write command and the second NVMe command is a read command.

14. The accelerator of claim 12, wherein one of the first NVMe command and the second NVMe command is a write command to a one of a plurality of namespaces, the namespaces having a format of a namespace associated with a solid state drive (SSD), and the other of the first and second NVMe commands is a read command to the one of the plurality of namespaces, wherein each of the namespaces is associated with a respective acceleration function and is not associated with an SSD namespace.

15. The accelerator of claim 12, wherein the first NVMe command and the second NVMe command are vendor-specific commands.

16. The accelerator of claim 15, wherein the second NVMe command includes a second memory address to which the result data is to be transmitted, and wherein the NVMe interface being configured to signal the hardware accelerator to transmit the result data in response to receiving the second NVMe command includes the NVMe interface being configured to signal the hardware accelerator to write the result data to the second memory address.

17. The accelerator of claim 11, wherein the NVMe interface is further configured to:
determine, that the hardware accelerator has completed performing the acceleration function; and
send to the host a NVMe complete message indicating that the acceleration function has been performed.

18. The accelerator of claim 11, wherein the first NVMe command includes a first memory address from which input data is to be read, and wherein the NVMe interface is further configured to signal the hardware accelerator to read the input data from the first memory address included in the first NVMe command in addition to performing the acceleration function on the input data to generate the result data.

19. The accelerator of claim 11, wherein the NVMe interface being configured to receive the first NVMe command comprises the NVMe interface being configured to receive the first NVMe command via a network connecting the NVMe interface and the host.

20. The accelerator of claim 11, further comprising a Controller Memory Buffer (CMB), wherein the NVMe interface being configured to receive the first NVMe command at the NVMe interface comprises the NVMe interface being configured to receive the first NVMe command at the CMB.

* * * * *